(12) United States Patent
Chirikov et al.

(10) Patent No.: US 11,044,771 B2
(45) Date of Patent: Jun. 22, 2021

(54) METHOD AND DEVICE FOR SHARING AN ESTABLISHED CONNECTION BETWEEN A PRIMARY DEVICE AND ONE OF A PLURALITY OF SECONDARY DEVICES IN A NETWORK

(71) Applicant: Telefonaktiebolaget LM Ericsson (publ), Stockholm (SE)

(72) Inventors: Roman Chirikov, Stockholm (SE); Per Elmdahl, Linkoping (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 16/959,413

(22) PCT Filed: Jan. 19, 2018

(86) PCT No.: PCT/EP2018/051350
§ 371 (c)(1),
(2) Date: Jun. 30, 2020

(87) PCT Pub. No.: WO2019/141375
PCT Pub. Date: Jul. 25, 2019

(65) Prior Publication Data
US 2020/0337100 A1    Oct. 22, 2020

(51) Int. Cl.
*H04W 88/04* (2009.01)
*H04W 76/14* (2018.01)
(Continued)

(52) U.S. Cl.
CPC ............ *H04W 76/14* (2018.02); *H04W 4/70* (2018.02); *H04W 4/80* (2018.02); *H04W 8/005* (2013.01); *H04W 84/18* (2013.01)

(58) Field of Classification Search
CPC combination set(s) only.
See application file for complete search history.

(56) References Cited

U.S. PATENT DOCUMENTS 9,712,266 B2 * 7/2017 Linde ...................... H04W 4/80
2007/0280163 A1   12/2007 Zhang
(Continued)

FOREIGN PATENT DOCUMENTS

WO   2014060584 A1   4/2014
WO   2016159844 A1   10/2016

OTHER PUBLICATIONS

PCT International Search Report, dated Sep. 17, 2018, in connection with International Application No. PCT/EP2018/051350, all pages.
(Continued)

*Primary Examiner* — Cindy Trandai
(74) *Attorney, Agent, or Firm* — Leffler Intellectual Property Law, PLLC (57) ABSTRACT

A method of sharing an established connection between a primary device in a network and one of a plurality of secondary devices. The method comprising the steps of receiving from an unconnected secondary device said plurality of secondary devices, an advertising packet for identifying said unconnected secondary device, sending, to said unconnected secondary device, a connection request based on said received advertising packet for establishing a connection between said unconnected secondary device and said primary device, said connection being shared among said unconnected secondary device and said one of said plurality of secondary devices, and transmitting, to secondary devices sharing an established connection, connection parameters, wherein said connection parameters define a time shared multiplexing scheme thereby facilitating sharing of said established connection. A complementary method and device for performing a method according to the present disclosure are also presented herein.

12 Claims, 5 Drawing Sheets

(51) Int. Cl.
  *H04W 4/70* (2018.01)
  *H04W 4/80* (2018.01)
  *H04W 8/00* (2009.01)
  *H04W 84/18* (2009.01)

(56) References Cited

U.S. PATENT DOCUMENTS

| | | | | |
|---|---|---|---|---|
| 2009/0262674 | A1* | 10/2009 | Suzuki | H04L 47/828 |
| | | | | 370/310 |
| 2011/0076948 | A1* | 3/2011 | Jabara | H04W 84/18 |
| | | | | 455/41.2 |
| 2014/0040364 | A1* | 2/2014 | Baldwin | H04L 45/24 |
| | | | | 709/204 |
| 2014/0169599 | A1* | 6/2014 | Solum | H04R 25/554 |
| | | | | 381/315 |
| 2014/0355582 | A1* | 12/2014 | Kamath | H05K 999/99 |
| | | | | 370/338 |
| 2014/0357269 | A1* | 12/2014 | Zhou | H04W 76/14 |
| | | | | 455/434 |
| 2016/0269176 | A1* | 9/2016 | Pang | H04L 9/14 |
| 2017/0208424 | A1* | 7/2017 | Longjie | H04W 8/005 |
| 2017/0223163 | A1* | 8/2017 | Li | G06F 1/3215 |
| 2017/0231016 | A1* | 8/2017 | Park | H04W 12/068 |
| 2017/0289740 | A1* | 10/2017 | Yang | H04L 51/04 |
| 2017/0290068 | A1* | 10/2017 | VanBlon | H04W 76/40 |
| 2017/0303076 | A1 | 10/2017 | Song et al. | |
| 2019/0007888 | A1* | 1/2019 | Li | H04W 40/04 |
| 2019/0349718 | A1* | 11/2019 | Kwon | H04W 12/0431 |
| 2020/0196110 | A1* | 6/2020 | Jakobsson | H04W 4/029 |
| 2020/0196323 | A1* | 6/2020 | Church | H04W 4/80 |
| 2020/0236494 | A1* | 7/2020 | Ronan | H04W 76/10 |
| 2020/0296793 | A1* | 9/2020 | Cheong | H04W 4/80 |

OTHER PUBLICATIONS

PCT Written Opinion, dated Sep. 17, 2018, in connection with International Application No. PCT/EP2018/051350, all pages.

* cited by examiner

METHOD AND DEVICE FOR SHARING AN ESTABLISHED CONNECTION BETWEEN A PRIMARY DEVICE AND ONE OF A PLURALITY OF SECONDARY DEVICES IN A NETWORK

TECHNICAL FIELD

The present invention generally relates to the field of networks, more specifically to sharing an established connection between a primary device and one of a plurality of secondary devices in the network.

BACKGROUND

Bluetooth Low Energy, BLE, is a Wireless personal area network technology designed by the Bluetooth Special Interest Group, SIG, aimed at novel applications in healthcare, fitness, security, home automation industries etc. Compared to classic Bluetooth, BLE is intended to provide considerably reduced power consumption and cost while maintain a similar communication range. On the other hand, the amount of data being transmitted by BLE device is much less than classic Bluetooth devices.

A typical way of operating BLE is:

Using three advertisement channels to broadcast data without acknowledgements, or Using three advertising channels to setup a connection and Perform acknowledged message exchange over 37 data channels in a BLE connection Different from BLE data channels, advertising channels allow all BLE devices to listen and transmit without having a connection. There are three BLE advertisement channels. By default, the advertisement data packet is transmitted at all three channels every time. While listening, named scanning in BLE, the BLE device will stay at one channel for a specific interval before moving to another advertisement channel.

Apart from acknowledged packet exchange, connections benefit from exploiting congested channel, possibility to encrypt packets, fast packet exchange to quickly send fragments of a large amount of data and frequency hopping to avoid channels of bad quality.

A node acting as a relay in a Bluetooth mesh network scans the advertisement channels for mesh packets. When a packet is detected and received the node checks if it is the destination of the packet—if yes, the packet content is sent to the application where it is processed. If the node is not the destination of the packet the node checks in a Network cache if it has already received and forwarded the packet. If yes, the packet is discarded. If not, the packet is forwarded in the mesh network by re-transmitting it over the advertisement channels so that the neighbours of the node can receive it.

A wireless mesh network, WMN, comprises a plurality of mesh nodes organized in a mesh topology. Here, each mesh node is also some sort of provider by forwarding data to the next mesh node. The network infrastructure is decentralized and simplified because each mesh node only needs to be able to transmit to a neighbouring mesh node. Such wireless mesh networks could allow people living in remote areas and small businesses operating in rural neighbourhoods to connect their networks together for affordable internet connections.

Low-power wireless technologies use mesh network topologies to increase the network coverage and flexibility. A mesh network consists of machine devices, for instance sensors and actuators, and relay nodes, which have the capability to forward packets and eventually allow communication among nodes that are outside the radio range of each other.

The simplest and most straightforward networking method is flooding. In a flooding network, each relay that receives a packet will forward it. This method is robust to changes in the network topology. Also this approach fits well with the characteristics of devices in low power networks, which are usually constrained in terms of memory and computational resources.

Bluetooth mesh, officially launched in July 2017, is a highly-anticipated addition to the Internet of Things (IoT) connectivity space. The solution is based on flooding using broadcasting over a set of shared channels—the advertisement channels.

In a BLE connection, there is usually a device that advertises its presence in an advertising packet and a corresponding device that, upon receiving the advertising packet, initiates a connection between the two devices. The device that advertises its presence is referred to as an "Advertiser" and the device that initiates a connection between the two devices is referred to as the "Initiator". Once a connection is established between the two devices, The Initiator becomes the Master device and the Advertiser becomes the Slave device.

Currently there is a limit on the number of simultaneous connections that a master device can keep open. This number depends on the hardware and the implementation, but typically is between 5 and 10. Handling more devices requires closing and re-establishing connections which brings overhead in terms of exchanged packets and consumed energy, thereby increasing the use of channel resources and decreasing battery lifetime respectively.

SUMMARY

It is an object of the present disclosure to provide methods for sharing an established connection between a primary device and one of a plurality of secondary devices in a network.

It is another object to provide for devices supporting the sharing of an established connection between a primary device and one of a plurality of secondary devices.

In a first aspect of the present disclosure, there is provided a method of sharing an established connection between a primary device in a network and one of a plurality of secondary devices in said network.

The method comprising the steps of receiving, by said primary device, from an unconnected secondary device of said plurality of secondary devices, an advertising packet for identifying said unconnected secondary device, sending, by said primary device, to said unconnected secondary device, a connection request based on said received advertising packet for establishing a connection between said unconnected secondary device and said primary device, said connection being shared among said unconnected secondary device and said one of said plurality of secondary devices, and transmitting, by said primary device, to secondary devices sharing an established connection, connection parameters, wherein said connection parameters define a time shared multiplexing scheme thereby facilitating sharing of said established connection.

The solution according to the present disclosure makes use of allocation of different connection events to a different secondary devices that share the same connection the same primary device. As a result, the primary device will have one open connection which will be shared by many secondary devices using a time multiplexing scheme.

In the context of the present disclosure, a primary device may also be referred to as a "Master device", or simply as a "Master" and a secondary device may be referred to as a "Slave device" or as a "Slave". In order to establish a first connection, there should be a device that sends advertising packets—an advertiser, and a device that is receiving them and is capable to initiate a connection—an initiator. When a connection request is sent by the initiator, it assumes that the connection is established. In the connection request, the initiator sets the connection parameters, such as frequency hopping scheme, connection interval etc. Since then, the initiator becomes a master and the advertiser becomes a slave.

It was the insight of the inventors that by employing a time shared multiplexing scheme, a single connection could be shared between multiple slave devices. An advantage of such a solution is that several slaves, even more than 10, may remain connected to a master. This avoids the overhead signalling requirement of closing and establishing connections again if the number of slaves is more than what a master can handle at a given time.

Another embodiment according to the disclosure comprises the step of obtaining, by said primary device, an updated set of connection parameters, upon sending said connection request to said unconnected secondary device, wherein said updated set of connection parameters facilitate sharing of said established connection between said primary device and said one of said plurality of secondary devices including said unconnected secondary device.

Whenever an additional slave device that is not yet connected to a master device sends an advertising packet, the master device sends a connection request to the unconnected slave device. Following the connection request, the master device sends out a set of update connection parameters to all connected slave devices and also to the unconnected device from which it received an advertising packet. The updated set of connection parameters enable all the slave devices to effectively share the connection with the master device.

According to an embodiment, the network is a wireless mesh network and the primary and plurality of secondary devices are node devices in said wireless mesh network.

According to an embodiment, the wireless mesh network is a Bluetooth Low Energy, BLE, mesh network using Bluetooth as the radio access technology. The skilled person is aware of communication between devices using Bluetooth and furthermore, a wireless mesh network employing Bluetooth is being standardized. An additional advantage of the solution according to the present invention is that the solution does not require any changes in the current standard and is backwards-compatible with any Bluetooth Low Energy, BLE, slave devices.

According to an embodiment of the present disclosure, said connection parameters comprise at least one of:
  transmit window size;
  transmit window offset;
  connection interval;
  secondary device latency;
  supervision timeout; and
  instant.

These parameters are defined in the BLE standard and are used to define the time duration for which a connection stays active or when a connection becomes active. An update may involve one parameter at a time or alternately multiple parameters may be changed in order to achieve a desired shared connection scheme.

By properly setting transmit window size, transmit window offset, connection interval and slave latency, the master can make slaves being active during the assigned connection events and being idle during other time. In that manner many slaves can be multiplexed in time.

According to an embodiment of the present disclosure, the connection parameter being updated in said step of transmitting is the connection interval. In a preferred embodiment, the connection interval is the connection parameter that is being updated every time a further slave device is added to an existing connection.

According to a second aspect of the invention, there is presented a method of sharing an established connection between a primary device in a network and one of a plurality of secondary devices in said network, said method comprising the steps of sending, by an unconnected secondary device of said plurality of secondary devices, to said primary device, an advertising packet for identifying said unconnected secondary device, receiving, by said unconnected secondary device, from said primary device, a connection request in response to the said sent advertising packet, receiving, by said unconnected secondary device, connection parameters that enable said unconnected secondary device to share said established connection between said primary device and said one of said plurality of secondary devices, and sharing, by said unconnected secondary device, said established connection between said primary device and said one of said plurality of secondary devices in a time shared multiplexing scheme based on said received connection parameters.

The advantages and definitions of the first aspect of the invention are also associated with the second aspect of the invention.

According to an embodiment of the second aspect of the disclosure, the primary and plurality of secondary devices are node devices in a wireless mesh network.

In an embodiment according to the second aspect of the disclosure, the primary and plurality of secondary device are nod e devices in a wireless mesh network wherein said wireless mesh network is a Bluetooth Low Energy, BLE, mesh network using Bluetooth as the radio access technology.

In an embodiment according to the second aspect of the disclosure, connection parameters comprise at least one of:
  transmit window size;
  transmit window offset;
  connection interval;
  secondary device latency;
  supervision timeout; and
  instant.

In a further embodiment of the second aspect of the disclosure, the connection parameter being updated in said step of transmitting is the connection interval.

In a third aspect of the present disclosure, there is presented a primary device in a network arranged for sharing an established connection between said primary device and one of a plurality of secondary devices in said network to an unconnected secondary device of said plurality of secondary devices.

The primary device comprises a receiving module, arranged for receiving an advertising packet from said unconnected secondary device identifying said unconnected secondary device, sending module, arranged for sending a connection request to said unconnected secondary device subsequent to receiving said advertising packet by said receiving module, and transmitting module, arranged for transmitting connection parameters to secondary devices sharing said established connection wherein said connection parameters define a time shared multiplexing scheme thereby facilitating sharing of said established connection.

The advantages associated with the first and second aspects of the present disclosure are also associated with the third aspect of the disclosure.

According to an embodiment of the third aspect, the primary device further comprises obtaining module, arranged for obtaining a set of updated connection parameters upon sending, by said sending module, said connection request to said unconnected secondary device, said obtaining module further arranged to provide said set of updated connection parameters to said transmitting module.

According to a fourth aspect of the present disclosure, there is presented a computer readable storage medium comprising instructions which, when loaded on to one or more devices in a network, is arranged for performing the method according to any different method embodiments as presented in this disclosure.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
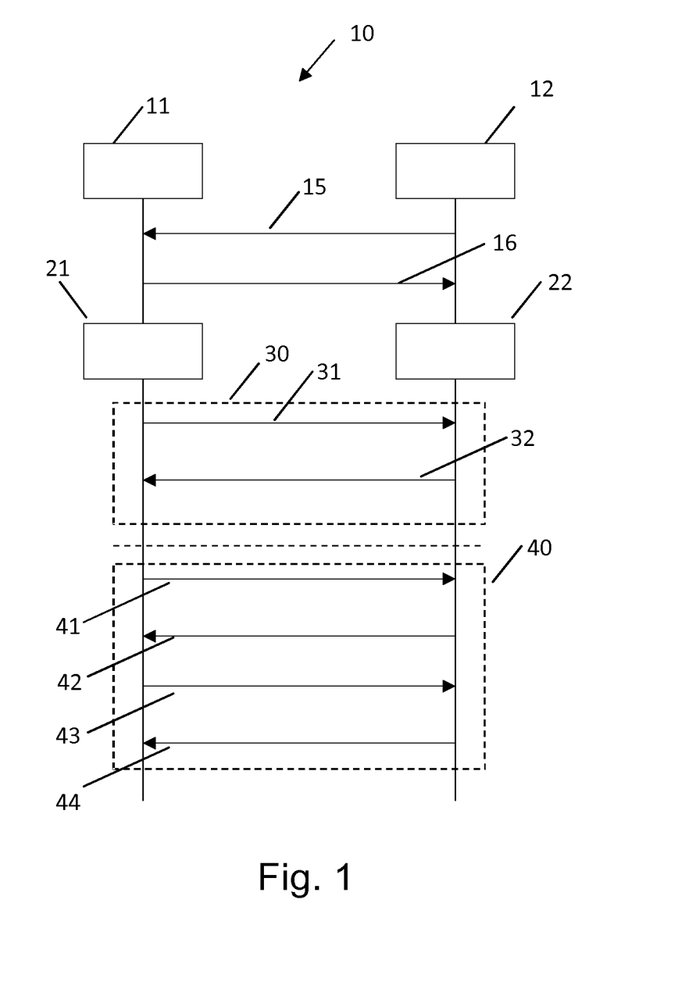
FIG. 1 schematically shows a method of establishing a connection between a primary device and a secondary device, according to prior art.

FIG. 1 schematically shows a method 10 of establishing a connection between a primary device 11 and a secondary device 12, according to prior art. There are mainly two steps in a Bluetooth Low Energy, BLE, connection—establishment and maintaining. To establish a connection, there should be a device that sends advertising packets. Such a device is termed as an advertiser or a secondary device 12. There should also be a device that is receiving the advertising packets and capable of initiating a connection. Such a device is called the initiator, or the primary device 11.

The primary device 11 receives an advertising packet 15 which is broadcast by the secondary device 12. The primary device 11 sends a connection request 16 and assumes that the connection is established. In the connection request 16, the primary device 11 sets connection parameters such as frequency hopping scheme, connection interval etc. Since then, the primary device 11 becomes the master 21 and the secondary device 12 becomes the slave 22. Within the scope of the invention, the term "primary device" may refer to a Master node both before and after establishing a connection, and the term "secondary device" may refer to a slave node both before and after establishing a connection.

The BLE connection is a set of connection events 30, 40 that occur every connection interval. During these events 30, 40, data packets are exchanged 31, 32, 41-44, between a Master 21 and a slave 22. The master 21 must send at least one packet 31, 41, 43, to the slave 22 every connection event 30, 40. But the slave can ignore a number of packets as per connection parameters known to the master and slave.

Figure 2:
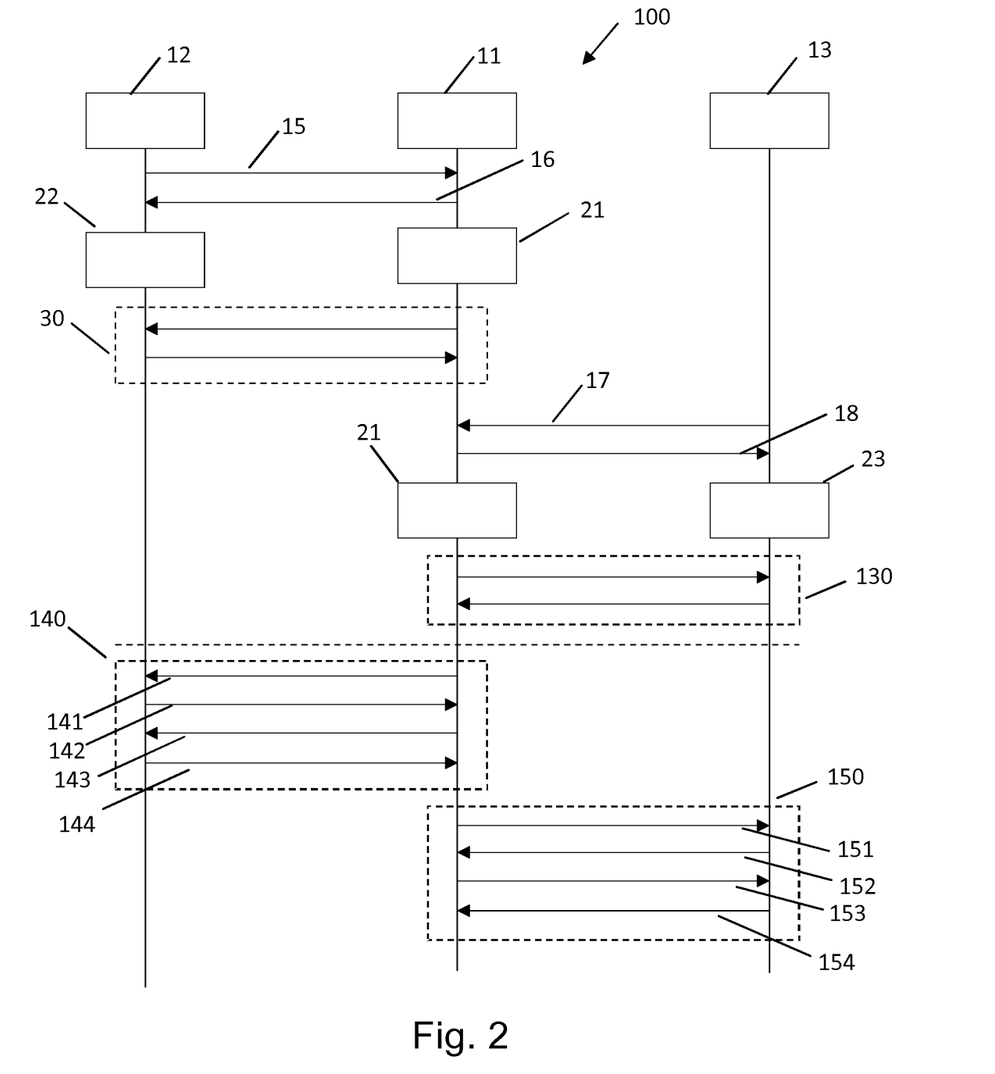
FIG. 2 schematically shows a method of establishing connection to a further secondary device according to prior art.

FIG. 2 schematically shows a method 100 of establishing connection to a further secondary device 13 according to prior art. It is known to establish connections to multiple secondary devices. A connection with a first secondary device 12 is established as illustrated in method 10 in FIG. 1. A connection between the primary device 11, 21 and the first secondary device 12, 22 is established a connection event 30 involving exchange of data packets occurs. Subsequently, the primary device 11, 21 receives an advertising packet 17 from a second secondary device 13. The primary device 11, 21 responds with a connection request 18 and the relevant connection parameters for establishing a connection with the secondary device 13.

Once a connection is established, there are separate connection events 30, 140 between the master 21 and the first slave 22 and separate connection events 130, 150 between the master 21 and the second slave device 23. In each of these connection events, the master exchanges data packets with any one of the slave device. The skilled person understands that connections may be established to more secondary devices in a similar manner. However, there is a limit on a number of simultaneous connections that a master device can keep open. This number typically depends on the hardware and implementation, but typically is between 5 and 10. Handling more devices requires closing and re-establishing connections which brings in overhead in terms of exchanged packet use and consume more energy.

Figure 3:
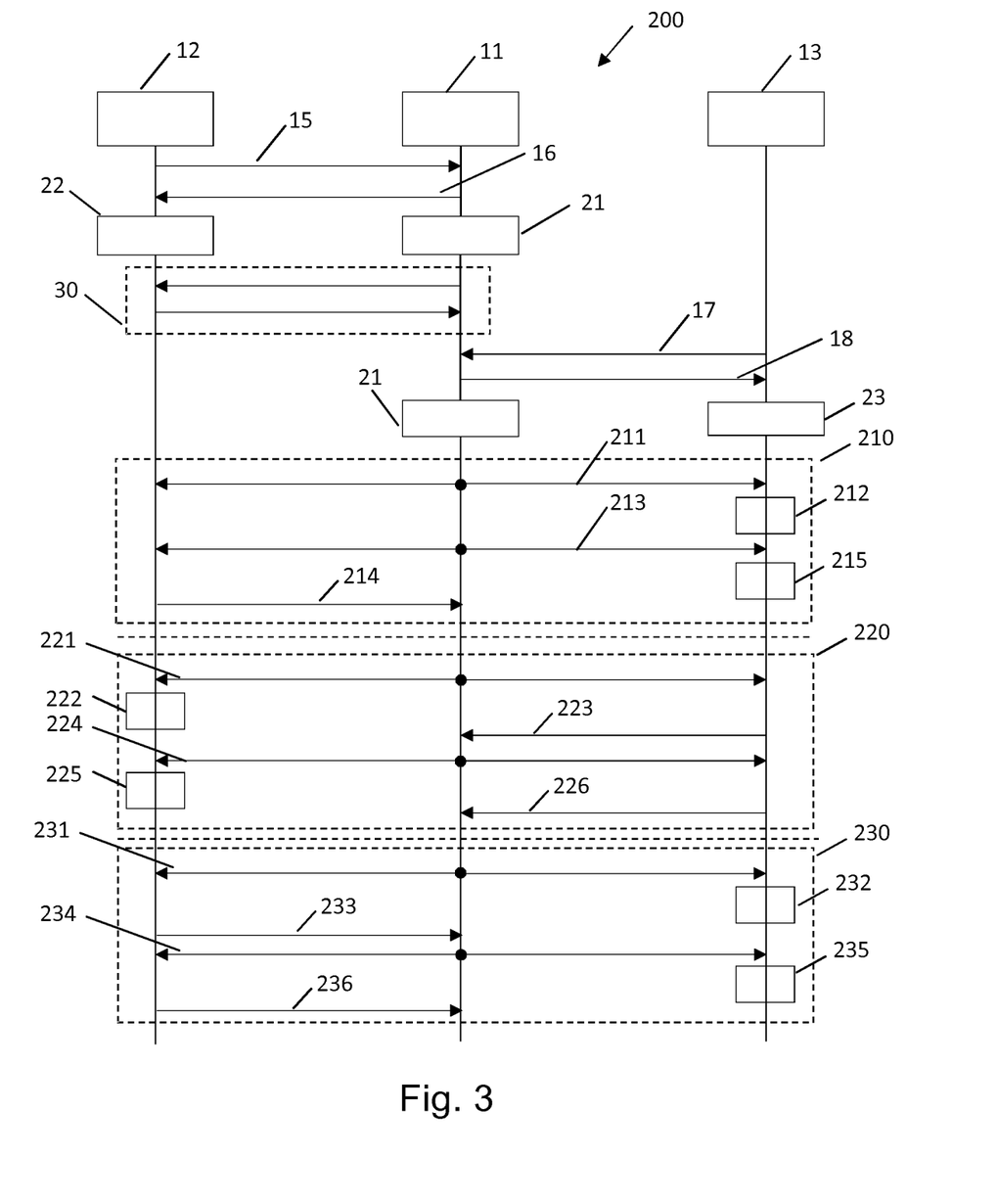
FIG. 3 schematically shows a method of sharing an established connection between a primary device and one of a plurality of secondary devices.

FIG. 3 schematically shows a method 200 of sharing an established connection between a primary device 11, 21 and one of a plurality of secondary devices 12, 13. A connection between a master device 11, 21 and a first secondary device 12, 22 is established according to known methods and exchange of data packets in connection event 30 also occurs according to previously known methods. When the primary device 11, 21 receives an advertising packet 17 from a further secondary device 13, the primary device 21 decided to include the further secondary device 13 in the same connection, thereby sharing the already established connection between the primary device 11, 21 and the first secondary device 12, 22.

The connection is shared by broadcasting to all slave devices currently sharing a connection, an updated set of connection parameters 211. The updated set of connection parameters 211 allow all connected secondary devices to share one connection. Thus the limit on the number of secondary devices 12, 13 that can be connected to a master device 11 is removed.

In each connection event 220, 230, data packets are broadcast by the master device 21 to all slave devices 22, 23 currently sharing the connection. At any given instant at least one of the slave devices is active and responds to the received data packets. The other slave devices are either in a sleep mode or choose to ignore the incoming data packet.

As an example, in connection event 220, slave device 22 is in a sleep mode. The master device 21 broadcasts data packets 221, 224. Slave device 22 ignores 222, 225 the incoming packets, whereas slave device 23 responds 223, 226 to the received data packets. A similar explanation applies mutatis mutandis, to the connection event 230 wherein slave device 23 is in a sleep mode and slave device 22 responds to the received data packets.

More secondary devices may be added to an existing connection. Each time a further secondary device is added to an existing connection, updated connection parameters are broadcast to all the nodes. The updated connection parameters define a scheme whereby each secondary device is able to listen to data packets at scheduled intervals thereby eliminating the need to re-establish connections and at the same time reduce energy consumption.

The updated connection parameters may be any one of:
transmit window size;
transmit window offset;
connection interval;
secondary device latency;
supervision timeout; and
instant.

Preferably, the updated connection parameter is the connection interval. By properly setting transmit window size, transmit window offset, connection interval and slave latency, the master can make slaves being active during the assigned connection events and being idle during other time. In that manner, many slaves can be multiplexed in time. The table below shows an example illustrating a schedule whereby three secondary devices—slave A, slave B and slave C share a connection with a master device. It can be seen that during each connection event, only one of the three slave devices is active, while the other two remain idle.

|  | Connection Event 1 | Connection Event. 2 | Connection Event 3 | Connection Event 4 | Connection Event 5 |
| --- | --- | --- | --- | --- | --- |
| Slave A | Active | Idle | Idle | Active | Idle |
| Slave B | Idle | Active | Idle | Idle | Active |
| Slave C | Idle | Idle | Active | Idle | Idle |

According to an embodiment, the connection parameters are updated at already connected nodes during the next period when the relevant nodes become active. According to this embodiment, if during connection event 2, if a new slave device—slave D is added to the shared connection, only slave device B receives the updated connection parameters. Slave devices A and C receive the updated parameters during the next connection event when they become active, i.e. connection event 4 and connection event 3 respectively.

The updated connection parameters may be determined locally or may be requested from a central node. In order to be determined locally, a suitable schedule for updated connection parameters may be stored in a table format at the master device. For example, the connection parameters may be predefined based on the number of secondary devices sharing a connection. Alternately, the master device may communicate with a central node indicating the number of secondary devices. The central node may provide the master device with a set of updated connection parameters.

Figure 4:
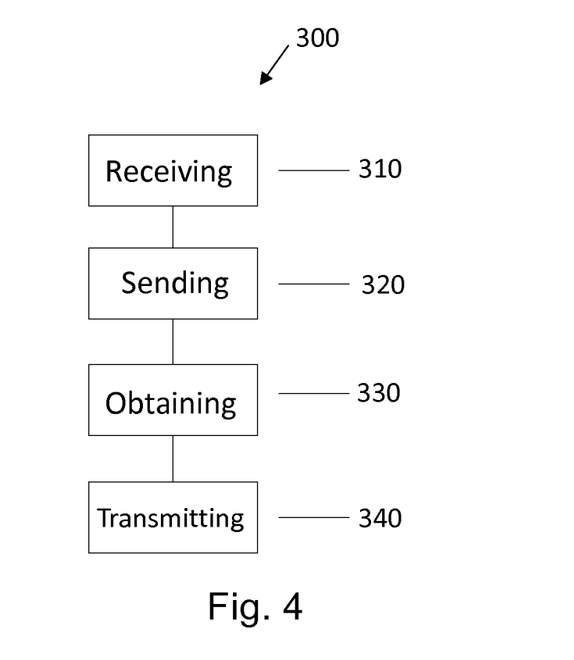
FIG. 4 schematically shows a method of sharing an established connection between the primary device and one of a plurality of secondary devices, by the primary device.

FIG. 4 schematically shows a method 300 of sharing an established connection between the primary device 11 and one of a plurality of secondary devices 12, 13, by the primary device 11. In a first step of receiving 310, the master device 11 receives an advertising packet from a further secondary device 13. The master device 11 sends 320 a connection establishment request to the further secondary device 13. The master device obtains 330 a set of updated connection parameters that allow the connection to be also share by the further secondary device. Subsequently, the primary device transmits 340 the updated connection parameters to all the connected nodes that are currently sharing a connection.

Figure 5:
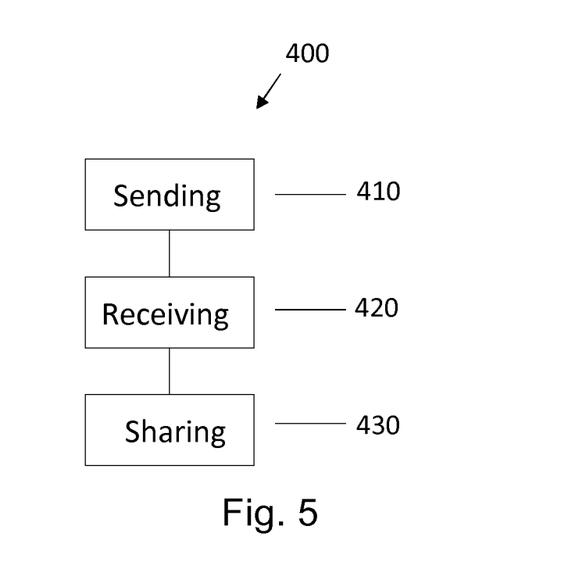
FIG. 5 schematically shows a method of sharing an established connection between the primary device and one of a plurality of secondary devices, by a secondary device.

FIG. 5 schematically shows a method 400 of sharing an established connection between the primary device 11 and one of a plurality of secondary devices 12, by a secondary device 13. In a first step of sending 410, the secondary device 13 sends an advertising packet to the primary device 11. Subsequently, the secondary device 13 receives 420 a request for establishing a connection, followed by an set of connection parameters that allow the secondary device 13 to share 430 the already established connection between the primary device 11 and the first secondary device 12.

Figure 6:
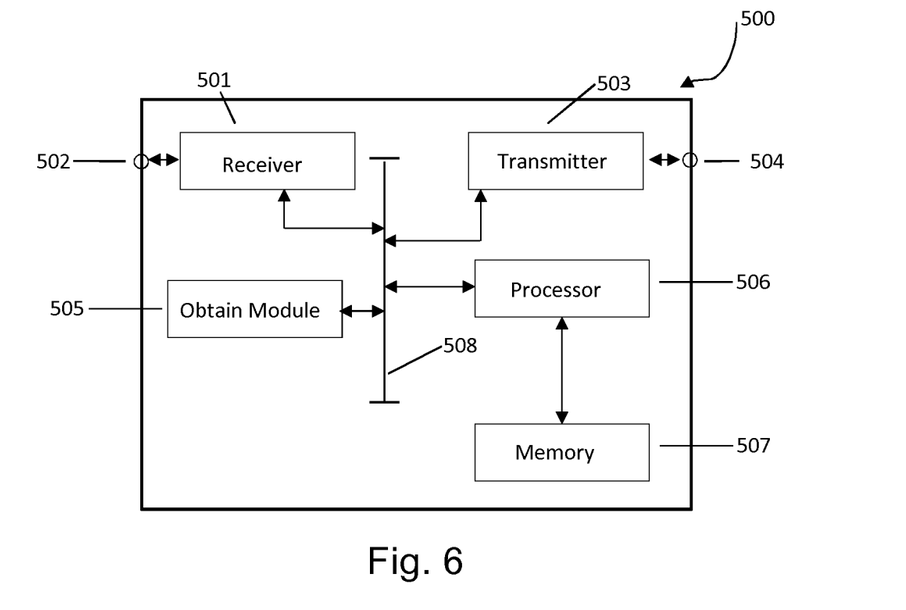
FIG. 6 schematically shows a node device arranged to perform a method according to the present disclosure.

FIG. 6 schematically shows a node device 500 arranged to perform a method according to the present disclosure. Node device 500 illustrates a master device according to the present disclosure. The node device 500 comprises of a receiver means 501, 502 arranged to receive incoming packets such as an advertising packet from other devices in a wireless mesh network. The transmitter means 503, 504 are arranged for sending packets to other nodes in the network.

The obtain module 505 is arranged to obtain a set of connection parameters that allow multiple secondary devices to share an existing connection. The memory 507 is arranged for storing a computer program product which when executed by the processor allows the node 500 to perform a method according to the present disclosure. The processor 506 may further be arranged to determine an updated set of connection parameters whenever an advertising packet is received from a yet unconnected secondary device. All internal equipments interact with one another via a communication bus 508. The receiver 501, 502 and the transmitter 503, 504 may also interact with external components such as a mobile phone or other provisioning devices during a phase of initializing the network.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method of sharing an established connection between a primary device in a network and one of a plurality of secondary devices in said network, said method comprising the steps of:

receiving, by said primary device, from an unconnected secondary device of said plurality of secondary devices, an advertising packet for identifying said unconnected secondary device;

sending, by said primary device, to said unconnected secondary device, a connection request based on said received advertising packet for establishing a connection between said unconnected secondary device and said primary device, said connection being shared among said unconnected secondary device and said one of said plurality of secondary devices; and transmitting, by said primary device, to secondary devices sharing an established connection, connection parameters, wherein said connection parameters define a time shared multiplexing scheme thereby facilitating sharing of said established connection.

2. The method according to claim 1, further comprising the step of:

obtaining, by said primary device, an updated set of connection parameters, upon sending said connection request to said unconnected secondary device, wherein said updated set of connection parameters facilitate sharing of said established connection between said primary device and said one of said plurality of secondary devices including said unconnected secondary device.

3. The method according to claim 1, wherein said network is a wireless mesh network.

4. The method according to claim 3, wherein said wireless mesh network is a Bluetooth Low Energy mesh network using Bluetooth as the radio access technology.

5. The method according to claim 1, wherein said connection parameter being updated in said step of transmitting is the connection interval.

6. A method of sharing an established connection between a primary device in a network and one of a plurality of secondary devices in said network, said method comprising the steps of:

sending, by an unconnected secondary device of said plurality of secondary devices, to said primary device, an advertising packet for identifying said unconnected secondary device;

receiving, by unconnected secondary device, from said primary device, a connection request in response to the said sent advertising packet;

receiving, by said unconnected secondary device, connection parameters that enable said unconnected secondary device to share said established connection between said primary device and said one of said plurality of secondary devices; and sharing, by said unconnected secondary device, said established connection between said primary device and said one of said plurality of secondary devices in a time shared multiplexing scheme based on said received connection parameters.

7. The method according to claim 6, wherein said network is a wireless mesh network.

8. The method according to claim 7, wherein said wireless mesh network is a Bluetooth Low Energy mesh network using Bluetooth as the radio access technology.

9. The method according to claim 6, wherein said connection parameter being updated in said step of transmitting is the connection interval.

10. The primary device according to claim 9 further comprising:

an obtaining module, arranged for obtaining a set of updated connection parameters upon sending, by said sending module, said connection request to said unconnected secondary device, said obtaining module further arranged to provide said set of updated connection parameters to said transmitting module.

11. A primary device in a network arranged for sharing an established connection between said primary device and one of a plurality of secondary devices in said network to an unconnected secondary device of said plurality of secondary devices, said primary device comprising:

a receiving module, arranged for receiving an advertising packet from said unconnected secondary device identifying said unconnected secondary device;

a sending module, arranged for sending a connection request to said unconnected secondary device subsequent to receiving said advertising packet by said receiving module; and a transmitting module, arranged for transmitting connection parameters to secondary devices sharing said established connection wherein said connection parameters define a time shared multiplexing scheme thereby facilitating sharing of said established connection.

12. A non-transitory computer readable storage medium comprising instructions which, when executed by one or more processors, cause the one or more processors to perform a method of sharing an established connection between a primary device in a network and one of a plurality of secondary devices in said network, said method comprising the steps of:

receiving, by said primary device, from an unconnected secondary device of said plurality of secondary devices, an advertising packet for identifying said unconnected secondary device;

sending, by said primary device, to said unconnected secondary device, a connection request based on said received advertising packet for establishing a connection between said unconnected secondary device and said primary device, said connection being shared among said unconnected secondary device and said one of said plurality of secondary devices; and transmitting, by said primary device, to secondary devices sharing an established connection, connection parameters, wherein said connection parameters define a time shared multiplexing scheme thereby facilitating sharing of said established connection.

* * * * *

UNITED STATES PATENT AND TRADEMARK OFFICE
CERTIFICATE OF CORRECTION

PATENT NO. : 11,044,771 B2
APPLICATION NO. : 16/959413
DATED : June 22, 2021
INVENTOR(S) : Chirikov et al.

Page 1 of 1

It is certified that error appears in the above-identified patent and that said Letters Patent is hereby corrected as shown below:

In the Specification

In Column 1, Line 16, delete "Wireless" and insert -- wireless --, therefor.

In Column 4, Line 42, delete "nod e" and insert -- node --, therefor.

In Column 8, Line 13, delete "an set" and insert -- a set --, therefor.

In the Claims

In Column 9, Line 30, in Claim 4, delete "Energy" and insert -- Energy (BLE) --, therefor.

In Column 10, Line 2, in Claim 8, delete "Energy" and insert -- Energy (BLE) --, therefor.

Signed and Sealed this
Tenth Day of May, 2022

Katherine Kelly Vidal
*Director of the United States Patent and Trademark Office*